(12) United States Patent
Gudka et al.

(10) Patent No.: US 10,824,528 B2
(45) Date of Patent: *Nov. 3, 2020

(54) TECHNIQUES AND SYSTEM FOR OPTIMIZATION DRIVEN BY DYNAMIC RESILIENCE

(71) Applicant: Capital One Services, LLC, McLean, VA (US)

(72) Inventors: Bhavik Gudka, Glen Allen, VA (US); Eric Barnum, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/202,048

(22) Filed: Nov. 27, 2018

(65) Prior Publication Data

US 2020/0167254 A1 May 28, 2020

Related U.S. Application Data

(63) Continuation of application No. 16/201,660, filed on Nov. 27, 2018, now Pat. No. 10,275,331.

(51) Int. Cl.
*G06F 11/00* (2006.01)
*G06F 11/26* (2006.01)
(Continued)

(52) U.S. Cl.
CPC ........ *G06F 11/261* (2013.01); *G06F 11/0709* (2013.01); *G06F 11/079* (2013.01);
(Continued)

(58) Field of Classification Search
CPC .. G06F 11/261; G06F 11/079; G06F 11/0793; G06F 11/0754; G06F 11/0709;
(Continued)

(56) References Cited

U.S. PATENT DOCUMENTS 7,263,632 B2 8/2007 Ritz et al.
7,606,165 B2 * 10/2009 Qiu ..................... H04L 41/0631
370/203

(Continued)

OTHER PUBLICATIONS

Author Unknown. "What is Zabbix?", Jul. 10, 2015, Zabbix, FISL 2015 workshop. https://www.slideshare.net/Zabbix/fisl-2015-workshop-on-problem-detection?ref=https://www.zabbix.com/notification.

(Continued)

*Primary Examiner* — Marc Duncan

(57) ABSTRACT

Disclosed are hardware and techniques for testing computer processes in a network system by simulating computer process faults and identifying risk associated with correcting the simulated fault and identifying computer processes that may depend on the corrected computer process. The interdependent computer processes in a network may be determined by evaluating a risk matrix having a risk score and non-functional requirement score. An analysis of the risk score and non-functional requirement score accounts for interdependencies between computer processes and identified corrective actions that may be used to determine an optimal network environment. The optimal network environment may be updated dynamically based on changing computer process interdependencies and the determined risk and robustness scores.

20 Claims, 6 Drawing Sheets

(51) Int. Cl.
  *G06F 11/07* (2006.01)
  *G06F 11/34* (2006.01)
  *H04L 12/26* (2006.01)
  *H04L 12/24* (2006.01)
(52) U.S. Cl.
  CPC ...... *G06F 11/0793* (2013.01); *G06F 11/3457* (2013.01); *H04L 41/0631* (2013.01); *H04L 41/0836* (2013.01); *H04L 41/145* (2013.01); *H04L 43/50* (2013.01); *G06F 2201/805* (2013.01); *H04L 43/16* (2013.01)
(58) Field of Classification Search
  CPC ............. G06F 11/3457; H04L 41/0836; H04L 41/0823; H04L 41/145
  See application file for complete search history.

(56) References Cited

U.S. PATENT DOCUMENTS

| | | |
|---|---|---|
| 7,770,063 B2 | 8/2010 | Robertson et al. |
| 8,484,288 B2 | 7/2013 | Lakshmanan et al. |
| 8,515,783 B1 | 8/2013 | Weeks |
| 8,533,608 B1 | 9/2013 | Tantiprasut |
| 8,667,334 B2 | 3/2014 | Dagan |
| 8,756,301 B2 | 6/2014 | Ennis |
| 8,819,131 B2 | 8/2014 | Hebert et al. |
| 9,015,301 B2 | 4/2015 | Redlich et al. |
| 9,195,971 B2 | 11/2015 | McConnell et al. |
| 9,454,294 B2 | 9/2016 | Sapuram et al. |
| 9,525,696 B2 | 12/2016 | Kapoor et al. |
| 9,578,073 B2 | 2/2017 | Bader-Natal et al. |
| 9,799,004 B2 | 10/2017 | Buford et al. |
| 9,876,827 B2 | 1/2018 | Chew et al. |
| 9,891,971 B1 | 2/2018 | Kuhhirte |
| 10,162,698 B2 | 12/2018 | Mah et al. |
| 10,169,133 B2 | 1/2019 | Golash et al. |
| 10,210,115 B2 | 2/2019 | MacKenzie et al. |
| 10,275,331 B1 * | 4/2019 | Gudka ................. H04L 41/0631 |
| 10,282,248 B1 * | 5/2019 | Gudka ................. G06F 11/0793 |
| 10,310,723 B2 | 6/2019 | Rathod |
| 10,412,210 B2 | 9/2019 | Bjontegard |
| 10,429,825 B2 | 10/2019 | Sait et al. |
| 10,484,480 B2 | 11/2019 | Calcaterra et al. |
| 10,769,043 B2 | 9/2020 | Sabharwal et al. |
| 2003/0043179 A1 | 3/2003 | Gusler et al. |
| 2003/0065986 A1 | 4/2003 | Fraenkel et al. |
| 2004/0153764 A1 | 8/2004 | Paradkar |
| 2004/0225381 A1 | 11/2004 | Ritz et al. |
| 2005/0169185 A1 | 8/2005 | Qiu et al. |
| 2005/0171752 A1 | 8/2005 | Patrizio et al. |
| 2006/0288259 A1 | 12/2006 | Battenfelder et al. |
| 2007/0095354 A1 | 5/2007 | Churchill et al. |
| 2007/0143398 A1 | 6/2007 | Graham |
| 2008/0091829 A1 | 4/2008 | Spataro et al. |
| 2008/0109683 A1 | 5/2008 | Erwin et al. |
| 2008/0126829 A1 | 5/2008 | Robertson et al. |
| 2008/0262890 A1 | 10/2008 | Korupolu |
| 2009/0183029 A1 | 7/2009 | Btheke et al. |
| 2011/0264956 A1 | 10/2011 | Ito et al. |
| 2012/0303772 A1 | 11/2012 | Ennis |
| 2014/0046645 A1 | 2/2014 | White et al. |
| 2014/0067702 A1 | 3/2014 | Rathod |
| 2014/0222916 A1 | 8/2014 | Foley et al. |
| 2014/0245173 A1 | 8/2014 | Knodt et al. |
| 2014/0282406 A1 | 9/2014 | Narasimhan et al. |
| 2015/0127628 A1 | 5/2015 | Rathod |
| 2015/0127979 A1 | 5/2015 | Doppalapudi |
| 2015/0163121 A1 | 6/2015 | Mahaffey et al. |
| 2015/0193720 A1 | 7/2015 | Uthra et al. |
| 2015/0227869 A1 | 8/2015 | Saraf et al. |
| 2015/0271008 A1 | 9/2015 | Jain et al. |
| 2016/0036718 A1 | 2/2016 | Shingari et al. |
| 2016/0065627 A1 | 3/2016 | Pearl et al. |
| 2016/0255139 A1 | 9/2016 | Rathod |
| 2016/0266962 A1 | 9/2016 | Rajasekharan et al. |
| 2016/0337435 A1 | 11/2016 | Nigam et al. |
| 2017/0123874 A1 | 5/2017 | Lewis |
| 2017/0147439 A1 | 5/2017 | Charters et al. |
| 2017/0249644 A1 | 8/2017 | DiMaggio et al. |
| 2019/0058638 A1 * | 2/2019 | Ahuja .................... H04L 45/38 |
| 2019/0097909 A1 | 3/2019 | Puri et al. |
| 2019/0121498 A1 | 4/2019 | Jakobovits et al. |
| 2019/0155870 A1 | 5/2019 | Prakash et al. |
| 2019/0207818 A1 * | 7/2019 | Niestemski ......... H04L 41/0681 |
| 2019/0245767 A1 | 8/2019 | Di Girolamo et al. |
| 2020/0004618 A1 | 1/2020 | Thornhill et al. |
| 2020/0092334 A1 | 3/2020 | Hiebert et al. |
| 2020/0175439 A1 | 6/2020 | Abu El Ata et al. |

OTHER PUBLICATIONS

Extended European Search Report for European Application No. 19206630.6 dated Apr. 24, 2020, 10 pages.
Extended Search Report for European Application No. 19206612.4 dated Apr. 17, 2020, 11 pages.

* cited by examiner

200

FROM FIG. 2A

240 — SELECTING THE LOCATED RESPONSE THAT CURES THE INDICATED PROCESS VOLATILITY OF THE TEST COMPUTER-IMPLEMENTED PROCESS TO BE IMPLEMENTED IN THE SIMULATION INSTANCE OF THE NETWORK ENVIRONMENT

245 — SIMULATING IMPLEMENTATION OF THE LOCATED RESPONSE STRATEGY IN THE NETWORK ENVIRONMENT TO CURE THE INDICATED PROCESS VOLATILITY OF THE TEST COMPUTER-IMPLEMENTED PROCESS

250 — GENERATING A CURE RESULT SNAPSHOT OF PROCESS HEALTH OF EACH OF THE NUMBER OF COMPUTER-IMPLEMENTED PROCESSES

255 — EVALUATING THE PRE-BREAKAGE SNAPSHOT, THE SIMULATION RESULT SNAPSHOT, AND THE CURE RESULT SNAPSHOT WITH REFERENCE TO ONE ANOTHER

260 — BASED ON THE RESULTS OF THE EVALUATION, IDENTIFYING A NETWORK ENVIRONMENT ARCHITECTURE AS AN OPTIMAL NETWORK ARCHITECTURE THAT CURES THE PROCESS VOLATILITY OF THE TEST COMPUTER-IMPLEMENTED PROCESS

Simulation Results

340    System 1 Reaction to Break Event 1-100: System 1 Breaks

345    System 1 Reaction to Break Events 100 +: No Reaction

350    System 1 Reaction to Fix Events 1-100: No Effect on System 1

355    System 1 Reaction to Fix Event 101: System 1 breaks

360    System 1 Reaction to Fix Event 102: Improved Process Health

FIG. 3

TECHNIQUES AND SYSTEM FOR OPTIMIZATION DRIVEN BY DYNAMIC RESILIENCE

RELATED APPLICATIONS

This application is a continuation of U.S. patent application Ser. No. 16/201,660, entitled "TECHNIQUES AND SYSTEM FOR OPTIMIZATION DRIVEN BY DYNAMIC RESILIENCE" filed on Nov. 27, 2018. The contents of the aforementioned application is incorporated herein by reference.

BACKGROUND

The current state of technology remediation is that, when computer process, computer hardware or software breaks, people gather resources and execute failsafes and contingency plans to recover the broken technology (i.e., the broken computer process, broken computer hardware or software). Workarounds and typical break-fix activities are the mainstays of technology remediation and make up the best practices for how to recover technological services when something goes awry. The aim of these recovery plans is address three metrics commonly used to indicate the efficacy of a technology remediation system: mean time to detect (MTTD); mean time to repair (MTTR); and mean time between failures (MTBF). An effective technology remediation system implements processes that reduce MTTD and MTTR, while increasing the MTBF.

There are several commercial systems with offerings, such as Zabbix that allow a computer system "break-fix" to be paired with a "Response." These commercial offerings, however, tend to require specific break events to trigger a single response. The evolution of technology services (e.g., computer systems that implement services and applications) means that the technological environments, technology and their frameworks are becoming increasingly complex. Moreover, the identification of any single "root causing break event" may be obscured by cloud-based services such as Amazon web services (AWS), Microsoft Azure, Oracle Cloud, Apache Hadoop, or Google Cloud platform, cross connections with physical hardware-based networks, and the many development frameworks and different coding languages that make up even simple applications. Presently, the determination of where a root-cause source of a technology problem is substantially an all-human experience driven, and humans are slow providers of "production system support" and "incident triage."

While there are multiple chaos testing systems coming into the market, these systems typically interject some outcome of a disruption, for example, CPU utilization spikes to 100%, or network traffic is cut off. While these testing systems provide interesting tests to highlight whether a system supposedly designed to be resilient is truly resilient, the testing systems are impractical representations of what happens with operational technology products and computing systems. For example, a drop in network traffic can occur but the "Why" it occurred and the "How" it occurred are not realistic representations of an actual system when tested by the presently available chaos testing products.

It would be beneficial if a system or process was available that enabled network architecture optimization by identifying interdependencies and utilizing scoring techniques to further identify effects of system degradation and/or resiliency.

SUMMARY

Disclosed is an example of a method. The disclosed method example includes monitoring, by monitoring component, a simulation instance of a number of computer-implemented processes operating in a network environment of an enterprise. A pre-breakage snapshot of a process health of each of the number of computer-implemented processes may be generated. The pre-breakage snapshot, for each computer-implemented process of the plurality of computer-implemented processes, may include a robustness score and a risk score. The robustness score indicates a process health of each computer-implemented process of the number of computer-implemented processes and the risk score indicates a threshold between automated correction and manual correction of a degrading system. A simulation processing component executing the simulation instance may generate a simulated break event flag indicating a process volatility in a test computer-implemented process of a number of computer-implemented processes. The monitoring component may generate, in response to the simulated break event flag generated by the simulation processing component, a simulation result snapshot of process health of each of the plurality of computer-implemented processes. The simulation result snapshot may include an updated robustness score and an updated risk score for each computer-implemented process of the number of computer-implemented processes. Rules engine processing component may access a library of runbooks. Each runbook in the library of runbooks addresses a respective computer-implemented process of the number of computer-implemented processes operating in the network. Each respective runbook includes a number of response strategies. Each final response strategy of the number of response strategies is implementable to cure specific process volatilities of the respective computer-implemented process addressed by the respective runbook. Based on the simulated break event flag, a specific runbook in the library of runbooks that addresses process volatilities of the test computer-implemented process may be identified. A final response strategy may be located in the specific runbook that cures the indicated process volatility of the test computer-implemented process. The located final response is selected cure the indicated process volatility of the test computer-implemented process to be implemented in the simulation instance of the network environment. The simulation processing component may simulate implementation of the located final response strategy in the network environment to cure the indicated process volatility of the test computer-implemented process. The monitoring component may generate, in response to the simulated implementation of the final response strategy, a cure result snapshot of process health of each of the plurality of computer-implemented processes. The pre-breakage snapshot, the simulation result snapshot, and the cure result snapshot may be evaluated with reference to one another. Based on results of the evaluation, a network environment architecture is identified as an optimal network architecture that cures the process volatility of the test computer-implemented process. The optimal network architecture may have a below-threshold risk score for each of the plurality of computer-implemented processes operated by the enterprise and an above-threshold robustness score for each of the plurality of computer-implemented processes.

Disclosed is a system that includes simulation processing component, monitoring component, a runbook library and rules engine processing component. The simulation processing component may be configured to simulate, in response to inputs, process volatilities of a plurality of computer-implemented processes in a simulated instance of a network environment. The monitoring component may be coupled to the simulation processing component and may be configured to provide process health information of each computer-implemented process of the plurality of computer-implemented processes in response to the simulated process volatilities. The runbook library stores a number of runbooks corresponding to the plurality of computer-implemented processes. The rules engine processing component is coupled to the monitoring component, the simulation processing component and the runbook library. The simulation processing component is further configured to generate in the simulated instance of the network environment a break event for a computer-implemented process under test, the generated break event indicating a process volatility occurring in the computer-implemented process under test. The simulation processing component receives a final response that cures the process volatility occurring in the computer-implemented process under test. The simulation processing component is configured to apply the final response to the simulated instance of the network environment to cure the simulated break event and generate a pre-breakage snapshot based on monitoring information provided by the monitoring component. The pre-breakage snapshot is a collection of process health values of each computer-implemented process that includes a robustness score and a risk score. The robustness score indicates a process health of each computer-implemented process of the plurality of computer-implemented processes, and the risk score indicates a threshold between automated correction and manual correction of a degrading system. The simulation processing component generates, in response to the simulated break event, a simulation result snapshot. The simulation result snapshot is a collection of simulation-responsive process health values of each of the plurality of computer-implemented processes including an updated robustness score and an updated risk score. In response to application of the final response, the simulation processing component is configured to generate a cure result snapshot. The cure result snapshot is a collection of cure-responsive process health values of each of the plurality of computer-implemented processes including a cure-related robustness score and a cure-related risk score. The rules engine processing component is configured to access a specific runbook associated with the computer-implemented process under test from the runbook library, the specific runbook containing respective final responses for a plurality of process volatilities having potential to occur in the computer-implemented process under test. The rules engine processing component is configured to select from the respective final responses in the specific runbook the final response that cures the simulated break event and forward the final response to the simulation processing component. The pre-breakage snapshot, the simulation result snapshot, and the cure result snapshot are evaluated with reference to one another by the rules engine processing component. Based on a result of the evaluation, a network environment architecture may be identified as an optimal network architecture that cures the process volatility of the computer-implemented process under test. The optimal network architecture may have a below-threshold risk score for each of the plurality of computer-implemented processes of the network environment and an above-threshold robustness score for each of the plurality of computer-implemented processes of the network environment.

Also, disclosed is a non-transitory computer-readable storage medium. The computer-readable storage medium stores computer-readable program code executable by a processor. Execution of the computer-readable program code causes the processor to generate, while monitoring a simulation instance of a plurality of computer-implemented processes of a network environment, a pre-breakage snapshot of a process health of each of the plurality of computer-implemented processes. The pre-breakage snapshot, for each computer-implemented process of the plurality of computer-implemented processes, includes a robustness score and a risk score. The robustness score indicates a process health of each computer-implemented process of the plurality of computer-implemented processes. The risk score indicates a threshold between automated correction and manual correction of a degrading system. A simulated break event flag indicating a process volatility in a test computer-implemented process of a number of computer-implemented processes of the network environment may be generated. In response to the simulated break event flag generated by the simulation processing component, a simulation result snapshot of process health of each of the plurality of computer-implemented processes is generated. The simulation result snapshot includes an updated robustness scores and an updated risk score for each of the number of computer-implemented processes. A library of runbooks is accessed via a coupling to a runbook library via the network environment. Each runbook in the library of runbooks addresses a respective computer-implemented process of the number of computer-implemented processes, and each respective runbook includes a number of final response strategies. Each final response strategy of the number of final response strategies is implementable to cure specific process volatilities of the computer-implemented process addressed by the respective runbook. Based on the simulated break event flag, a specific runbook is identified in the library of runbooks that addresses process volatilities of the test computer-implemented process. A response strategy is located in the specific runbook that cures the indicated process volatility of the test computer-implemented process. The located response that cures the indicated process volatility of the test computer-implemented process is applied to the test computer-implemented process in the simulation instance of the network environment. An implementation of the located response strategy is simulated in the simulation instance of the network environment to cure the indicated process volatility of the test computer-implemented process. In response to the simulated implementation of the final response strategy, a cure result snapshot of process health of each of the plurality of computer-implemented processes may be generated. The pre-breakage snapshot, the simulation result snapshot, and the cure result snapshot are evaluated with reference to one another. Based on the results of the evaluation, a network environment architecture is identified as an optimal network architecture that cures the process volatility of the test computer-implemented process. The optimal network architecture has a below-threshold risk score for each of the plurality of computer-implemented processes operated by the enterprise and an above-threshold robustness score for each of the plurality of computer-implemented processes.

BRIEF DESCRIPTION OF THE DRAWINGS

FIG. 2A and FIG. 2B illustrate an example process performed by an apparatus that determines an optimal network architecture.

FIG. 3 shows an example of simulation result that may be evaluated according to the example process described with reference to FIGS. 2A and 2B.

DETAILED DESCRIPTION

Figure 1:
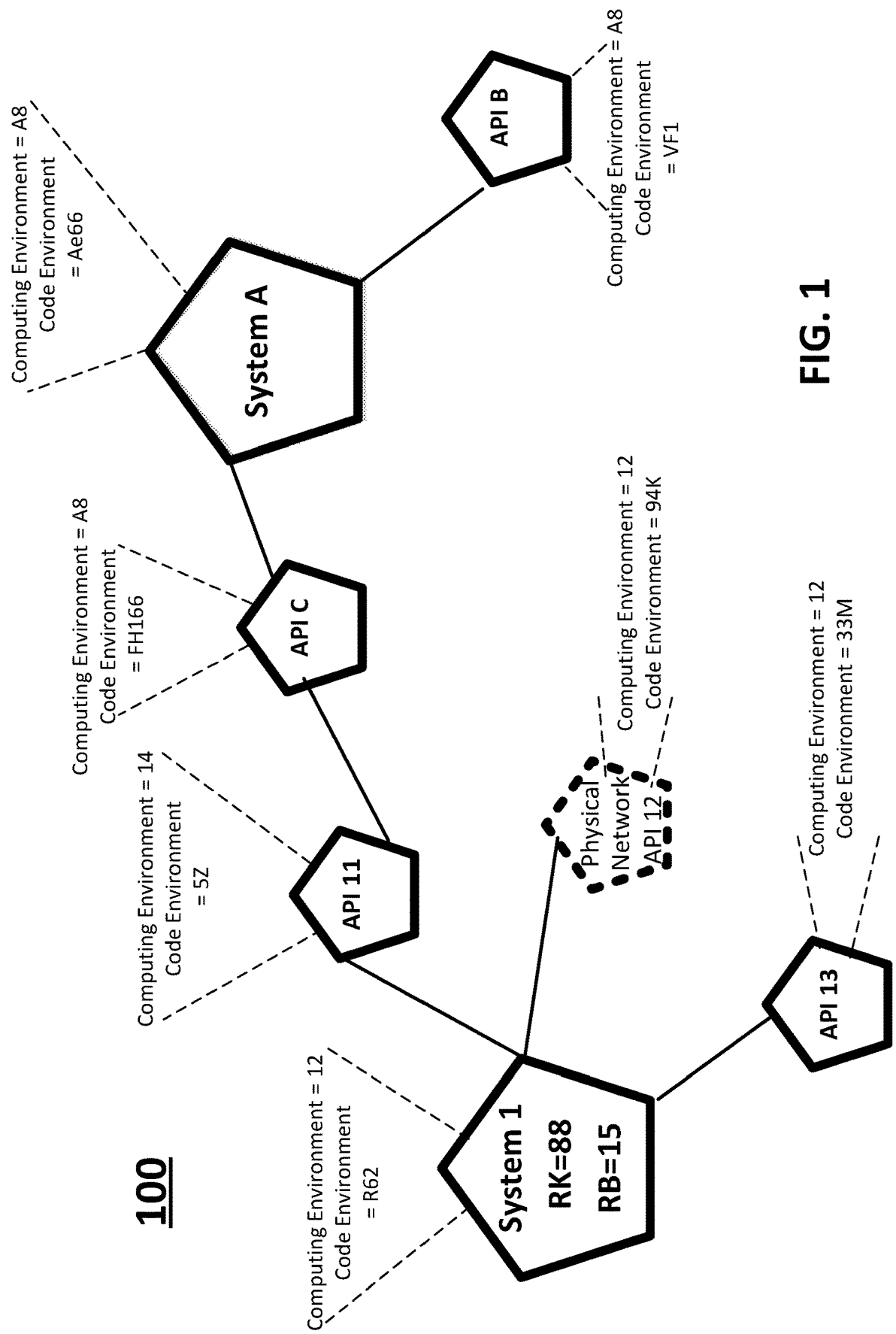
FIG. 1 illustrates a network environment example of a computer process auto-recovery system implementation.

Various embodiments are generally directed to techniques to evaluate the computer process status in a network environment based on interdependencies of the computer processes and identify a response that corrects root causes of any process faults. Embodiments include a system optimizing apparatus that may be an apparatus that utilizes a rules engine that may be configured to account for interdependencies between large numbers of computer applications in an enterprise (e.g., upwards of 2000 in some enterprises) and an even larger number of application programming interfaces (API), which may be upwards of 20,000 APIs in some enterprises) that operate throughout an enterprise network environment. For example, the rules engine may run on its own and learn as more data is processed. The rules engine may learn more about the computer application or API interdependencies using statistical learning or machine learning and become self-optimizing based on the learning. The rules engine may assist in the determination of correlations between the Break and Fix Events, using the determined correlations generate a scoring matrix (containing elements related to different system attributes, such as a Risk attribute, a Security Threat attribute, or other attributes) such that a "Best Fix" can by dynamically matched to the indicated breakages for automatic or human-reviewed deployment. A break event may be an indication of nearly anything that goes awry with a process, such as a failure It may be helpful to explain terminology frequently used in this application, such as break event and fix event, break risk assessment value, fix risk assessment value, a process fault or a process volatility, a process attribute, a process break, and the like. A break event, for example, may be output by a monitoring system as an indication of nearly anything that goes awry with a process, such as a failure to connect to a service, failure to receive an input within a prescribed time or after multiple requests, regularly exceeding time limits for completing tasks, memory allocation errors or limit problems or the like. An example of a functional process fault may be a potential operational breakdown or functional breakdown of a computer-implemented process but may also be an issue with a non-functional process requirement or process attribute, such as process stability, process security, process usability, process performance, process response time, resilience, or the like, of the computer-implemented process. For example, process stability in the network environment may be one non-functional process attribute that the system optimizing apparatus may attempt to control or respond to changes of, the process attribute or attributes. Operability or Usability are examples of non-functional process attributes and the system optimizing apparatus may control or respond to changes of the system that affect these non-functional process attributes. For example, operability may be the ability to keep a system or equipment within the system operating reliably and safely. While usability may, for example, be considered an extent to which the operating application or system may be used to achieve quantifiable levels of utility, improved user experience and user satisfaction. A process break may be a failure or shutdown of a computer-implemented process. The presence of a process volatility, or a process fault may cause generation of a break event that in turn may cause the generation of a break event flag. Or, a break event flag may correspond to a break event, and the break event may correspond to a process volatility or process fault.

Non-functional process attributes may also be referred to as qualities, quality goals, quality of service requirements, constraints, non-behavioral requirements, or technical requirements. Non-functional attributes may describe how a system is supposed to be. Conversely, functional requirements may describe what a system is supposed to do.

The following examples illustrate the improvements in the technology self-optimization provided by the disclosed processes, apparatus and systems. For example, the disclosed subject matter enables the classification of the break event by risk event so that correction, referred to herein as a "fix", "corrective action", or "response", of the break can be linked to the most appropriate response, fix or corrective action. The improvement to the technology auto-recovery and remediation services may be measured by commonly-used industry terms, such as mean time to detect issues (MTTD), mean time to repair (MTTR) and mean time between failures (MTBF) that are achieved by associating a risk of correction while addressing the correction of any root causes of indicated process faults. The fix, corrective action, or response may not completely "correct" the computer process but may simply correct performance of the computer process such that no monitoring component indicates a break event. In other words, the computer process is not exceeding any thresholds or guardrails.

When sufficient runbooks have been assembled and are accessible by processing component, the runbooks may be analyzed to determine matches between Break and Fix events. This enables processors and systems to implement techniques that may be referred to as "resilience hardening." By leveraging the break-fix information in the runbooks and the ability to determine the matching between the break-fix information in all the runbooks. A system may determine a fix of a first computer process for in response to a first break flag, but also identifies, based on experience gleaned from simulations, a second computer process that has an adverse reaction to the determined fix, and automatically implements a fix to the adverse reaction, thereby "hardening" the second computer process while ensuring that the fixes keep the overall system resilient to the always present breaks.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

Using risk scoring, a network picture of any system and its up/downstream dependencies may be created that shows a "stable state risk." That is, the inherent risk of a working technology (e.g., computer-implemented process) system's breakage fluctuates like a heartbeat as systems around it experience issues.

Robustness may be viewed as a computer system's ability to continue to function despite operational faults and/or incorrect inputs. The creation of a robustness score of any system at any point in time may be performed based on an inherent risk of the system failing and shutting down, and the robustness score may serve as a predictor of the system stability going forward from the time of creating the robustness score. Robustness may convey overall system stability, while risk may convey the threshold between automated and manual correction of a degrading system, The example method, system and techniques described with reference to the following figures may build a special database of self-optimizing patterns of break-fix event that is continually being fed break events by various monitoring tools. Using a risk matrix, risk scoring and robustness scoring of the effects of break events received from the various monitoring tools may be performed. The following examples show how risk and robust scoring may be used to create a unique view as to how the computer architecture of the system may be optimized.

FIG. 1 illustrates a graphical representation of a network including computer processes. The computer processes in the network system include systems 1 and A and application programming interfaces (API) 11-13, and API B and API C of a network 100. In the example of FIG. 1, the network environment may include enterprise network 107 and the connected systems A, 1, 103, 109 as well as the APIs B and C and 11-13 and cloud-based apps and services 108.

In the graphical representation of the example network system, computer processes such as system 1 and system A may be interdependent on one another. System 1 may have 3 APIs labeled API 11, API 12 and API 13. System A may have 2 APIs labeled API B and API C. System 1 and system A may be interdependent upon one another via connections through APIs 11 and C. System 1 has an inherent risk score (RK) of "88" and a robustness score (RB) is "15." For this example, the higher the score, the more extreme the state. So, a high risk score and a low robust score may mean system 1 has poor process health and is in a pre-breakage state.

By analyzing a runbook library (shown in another example), a computer processor may determine that this pre-breakage state has happened before. The computer processor may flag the 88/15 risk-robustness score of system 1, and may analyze these respective scores with reference to the interdependent system A and the respective APIs 11-13 and B and C. For example, based on the results of the analysis of the performance of each API and system, only the physical network API 12 (shown with dashed lines) is showing any signs of degraded performance. Since API 12 connects to the physical network, system A, APIs 11, 13, C and B and System A may all depend on API 12 to access the physical network or receive information from the physical network. The analysis may further reveal that the degraded performance of API 12 is why the robustness score of system 1 is now 15.

It may be helpful to explain an example of how the risk and robust scores may be determined. A risk matrix may be evaluated using a rules engine (shown in another example), and elements of the risk matrix may include: process break symptoms, environment-computing indicator, environment-code indicator, a break event, and a fix event. As an example, the risk and robust scoring of system 1 may be as follows: Symptom is that System 1 is scoring at 88 risk score (RK)/15 robustness score (RB); Computing Environment is 12 indicating that the computer in the Physical Network; Code Environment is irrelevant as there are no alerts from integrated monitoring; Break Event may be that Physical Network API 12 is, for example, experiencing "increased error logging above a threshold level;" and the Fix Event may be to restart the API servers for all APIs, which is a high RISK event because restarting the API servers causes System 1 (and all of the services it provides or supports) to go offline momentarily.

The computing environment may be an alphanumerical value that provides an indication of a particular system or API is in a network environment. The code environment may be an alphanumerical value that provides an indication of programming code used by a particular system or API in the network environment. For example, system 1 may have a computing environment indicator of 12 and a code environment indicator of R62, API 11 may have a computing environment indicator of 14 and a code environment indicator of 5Z, API 12 may have a computing environment indicator of 12 and a code environment indicator of 94K, API 13 may have a computing environment indicator of 12 and a code environment indicator of 33M, system A may have a computing environment indicator of A8 and a code environment indicator of Ae66, API C may have a computing environment indicator of A8 and a code environment indicator of FH166, and API B may have a computing environment indicator of A8 and a code environment indicator of VF1.

Given that an extensive library of runbooks that correlate Break and Fix Events is stored in memory and rather than cause System 1 to experience an actual break event like the shutdown, it may be useful to "drop test" or simulate the effect of break events on system 1 against all runbooks and use the monitoring component to log the computer-implemented processes of System 1 responses to simulated breaks and fixes as well as the effect of the simulated breaks and fixes on computer-implemented processes of other systems and APIs. Additional details and examples may be found in contemporaneously filed U.S. patent application Ser. No. 16/201,471, entitled TECHNOLOGY SYSTEM AUTO-RECOVERY AND OPTIMALITY ENGINE AND TECHNIQUES, the entire contents of which are incorporated by reference.

An example of the process for testing a reaction of systems and/or APIs in the network when the process health (i.e., compliance with functional and non-functional requirements) of one or more computer-implemented processes of a system or API in a network environment degrades may be described with reference to FIGS. 2A and 2B. As shown and explained further with reference to later examples, a system for testing the network's computer-implemented processes may include monitoring component and an apparatus that includes simulation processing component, rules engine processing component, a runbook data library, and connections to a network environment and the monitoring component. A process 200 may be implemented by having monitoring component monitor, at 205, a simulation instance of the number of computer-implemented processes operating in a network. The simulation instance of the number of computer-implemented processes operating in a network may include less than all of the computer-implemented processes operating in a network or may include all the computer-implemented processes operating in the network.

At 210, a pre-breakage snapshot of a process health of each of the number of computer-implemented processes may be generated. A snapshot may be a collection of the process health values output from the monitoring component at a specific time and for each computer-implemented process being monitored. The other information in the pre-breakage snapshot may include, for example, for each computer-implemented process of the number of computer-implemented processes at the time the pre-breakage snapshot was taken, a robustness score, a risk score, a time stamp and other information associated with the snapshot. The robustness score may indicate a process health of each computer-implemented process of the number of computer-implemented processes. The risk score may indicate a threshold between a need for automated correction and manual correction of a degrading system at the time the snapshot was taken. A degrading system may be considered a system that is at risk of breaking. For example, the break events generated in response to the degrading system may indicate a probability (e.g., 50%, 60%, 88%, 90% or the like) that the system will stop working or fail. The time stamp may indicate when the snapshot was taken, and the other information associated with the snapshot, may include information such as number of processes monitored, system names and the like. The health of the computer-implemented process (i.e., the compliance with functional and non-functional requirements), at the time that the pre-breakage snapshot was taken, may be determined from the snapshot based on the robustness scores for each of the computer-implemented processes in the snapshot. The effect of the degrading health of the process on other computer-implemented processes in the network environment may be ascertained from the risk score for each of the computer-implemented processes in the snapshot.

Figure 2A:
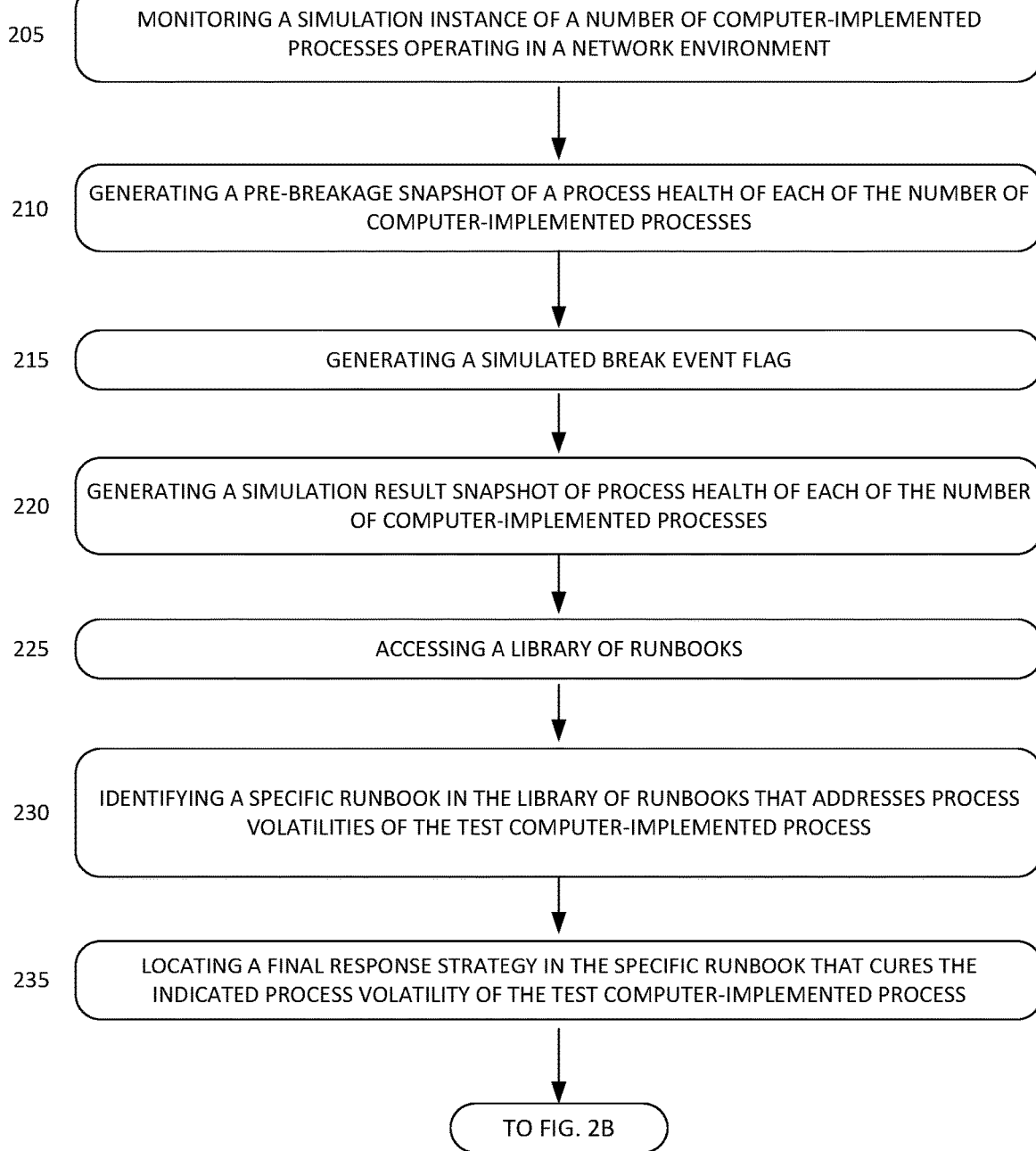

In an example of FIGS. 2A and 2B, the generation of the pre-breakage snapshot may include additional process steps. The monitoring component may be coupled to each of the computer-implemented processes in the plurality of computer-implemented processes. In the example, processing component, such as the simulation component or a computer processor, may receive from the monitoring component a list of break event flags for each computer-implemented process of the number of computer-implemented processes. A symptom of a break event, or a break event may be considered, a failure to connect to a service, failure to receive an input within a prescribed time or after multiple requests, regularly exceeding time limits for completing tasks, memory allocation errors or limit problems or the like. The respective break event symptoms may be identified for all the break event flags in the list of break event flags. For each identified respective break event symptom, the processing component may generate a computing environment corresponding to the respective break event symptom, a code environment corresponding to the respective break event symptom, and a final response strategy corresponding to the respective break event symptom for inclusion in the snapshot.

The rules engine may generate a robustness score for each respective computer-implemented process of the number of computer-implemented processes based on the identified break event symptom, the identified computing environment, the identified code environment, the break event symptom corresponding to the respective computer-implemented process and the final response strategy corresponding to the break event symptom of the respective computer-implemented process. The rules engine may generate a risk score for each computer-implemented process of the number of computer-implemented processes based on the identified break event symptom, and the final response strategy corresponding to the break event symptom of the respective computer-implemented process. The generated robustness and risk scores of each computer-implemented process may be stored in a data structure with a timestamp of when the pre-breakage snapshot was taken.

In FIG. 2A, the simulation processing component may execute an instance of a simulation of the network system of the enterprise. The executed instance of the simulation may have initial state settings based on the states of each of the computer processes being simulated shown in the pre-breakage snapshot. The simulation processing component executing the simulation instance may generate a simulated break event flag (215). The selection of the simulation break event flag to be used in the simulation may be based on a risk assessment value assigned to the break event. The assigned risk assessment value may have a range from a value indicating the process volatility has a high likelihood of causing a process break of the simulated computer-implemented process to a value indicating the process volatility has a low likelihood of causing a process break of the simulated computer-implemented process.

The simulated break event flag may indicate a process volatility of a test computer-implemented process. A process volatility may be a process fault, deficiency or failure that causes some change in the health status of the computer-implemented process. The test computer-implemented process may be one of many computer-implemented processes operated by an enterprise that are being simulated in the simulation instance. After the simulated break event flag is implemented in the simulation instance, computer-implemented processes of the many computer-implemented processes, other than the test computer-implemented process, may react to the process volatility indicated by the simulated break event flag.

In response to the simulated break event flag generated by the simulation processing component, the monitoring component may generate a simulation result snapshot of each of the number of computer-implemented processes (220). The simulation result snapshot may include updated robustness scores, updated risk scores or both for all the computer-implemented processes in the simulation instance. The simulation result snapshot may also include other information such an indication of interdependencies or the like.

When the simulation result snapshot is generated at 220, additional process steps may also be taken by processing component or other component. For example, the simulation component or other processing component may, in response to application of the located final response to the simulation instance, generate a list of break event flags for each computer-implemented process of the number of computer-implemented processes based on inputs received from the monitoring component. The inputs from the monitoring component may be received after the application of the located final response to the respective computer process, or computer processes that are to be corrected by the final response. In the example of FIG. 2A, the monitoring component may as part of the simulation, for example, continuously monitor the performance, or process health, of the computer processes in the simulation instance of the network environment. Continuing with the example of generating the simulation result snapshot, respective break event symptoms for all the break event flags in the list of break event flags may be identified. For each identified respective break event symptom, different attributes or parameters of the break event symptom may be determined based on an analysis of information associated with each of the received break event flags. For example, attributes or parameters may include a code environment corresponding to the respective break event symptom, and a final response strategy corresponding to the respective break event symptom. Once the attributes are determined, the break event symptom, the determined computing environment, the determined code environment and determined fix event may be stored into a data structure.

The rules engine processing circuit, for example, may generate a simulation robustness score for each respective computer-implemented process of the number of computer-implemented processes based on the identified break event symptom, the identified computing environment, the identified code environment, the break event symptom corresponding to the respective computer-implemented process and the final response strategy corresponding to the break event symptom of the respective computer-implemented process. The rules engine processing circuit may further generate a risk score for each computer-implemented process of the number of computer-implemented processes based on the identified break event symptom, and the final response strategy corresponding to the break event symptom of the respective computer-implemented process. The generated robustness and risk scores of each computer-implemented process for the simulation result snapshot may be stored with a timestamp indicating when the simulation result snapshot was taken in the data structure.

Returning to the process 200, the rules engine processing circuit may be coupled to a runbook library via the network environment and may access (225) a library of runbooks. For example, each runbook in the library of runbooks may address a respective computer-implemented process of the number of computer-implemented processes operated by an enterprise. Alternatively, or in addition, each respective runbook may include a number of final response strategies. Each final response strategy of the number of final response strategies may, for example, be implementable to cure specific process volatilities of the computer-implemented process addressed by the respective runbook.

Based on the simulated break event flag, a specific runbook may be identified, at 230, in the library of runbooks that addresses process volatilities of a computer-implemented process under test. A final response strategy may be located, at 235, in the specific runbook that cures the indicated process volatility of the test computer-implemented process. The simulation processing component may select (240) the located final response that cures the indicated process volatility of the test computer to be implemented in the simulation instance of the network environment. The simulation component simulates implementation of the located final response strategy in the network environment to cure the indicated process volatility of the test computer-implemented process (245).

In response to the simulated application of the located final response to the simulation instance of the network environment, processing component, such as the simulation component, may generate a modified robustness score of the updated robustness score and a modified risk score of the updated risk score for each computer-implemented process of the plurality of computer-implemented processes. Each of the modified robustness scores and each of the modified risk scores may be stored in the cure result snapshot.

In response to the simulated implementation of the final response strategy, the monitoring component may generate a cure result snapshot of process health of each of the number of computer-implemented processes in the simulated network environment (250). Each of the modified robustness scores and each of the modified risk scores in the cure result snapshot may be stored in a data structure within a data storage or memory.

The pre-breakage snapshot, the simulation result snapshot, and the cure result snapshot may be evaluated with reference to one another (255). Data or information from each of the pre-breakage, the simulation result, and the cure result snapshots may be used to populate the data structure (e.g., a risk matrix) that may be evaluated using a rules engine (shown in another example). For example, elements of the pre-breakage snapshot risk matrix, may include: process break symptoms, environment-computing indicator, environment-code indicator, a break event, and a fix event. The simulation result snapshot risk matrix, and the cure result snapshot risk matrix may include substantially similar elements. The evaluation of the pre-breakage snapshot, the simulation result snapshot, and the cure result snapshot risk matrices may include identifying score changes of robustness scores and risk scores between the pre-breakage snapshot and the simulation result snapshot, and changes in robustness scores and risk scores between the simulation result snapshot and the cure result snapshot for each of the computer-implemented processes. By evaluating the identified score changes by the rules engine, the rules engine may recognize interdependencies between each computer-implemented process in the number of computer-implemented processes. In response to recognizing the interdependencies, the rules engine or other processing component may identify an operating state of each respective computer-implemented process in the number of computer-implemented processes. The identified operating state of each respective computer-implemented process in the number of computer-implemented processes may provide the below threshold risk score for each respective computer-implemented process and the above-robustness score for each respective computer-implemented process.

Based on the results of the evaluation, a network environment architecture may be identified (260) as an optimal network architecture that cures the process volatility of the test computer-implemented process. The optimal network architecture may have a below-threshold risk score for each of the many computer-implemented processes operated by the enterprise and an above-threshold robustness score for each of the many of computer-implemented processes operated by the enterprise. The runbooks in the library of runbooks may be modified based on the identification of the optimal network environment.

FIG. 3 provides an example of the simulation results for discussion purposes. The following provides an example of how the system may respond with reference to the simulation results 300. In the example simulation results 300 shown in FIG. 3, system 1 is the system under test and may include a number of different computer-implemented processes. The simulation results include examples of what happens to system 1 when a simulated break event flag is generated that indicates a process volatility of a computer-implemented process, and what happens to system 1 when a fix event in a final response strategy is applied to system 1. The simulation results 300 may include results from hundreds or thousands of simulations performed on simulation instances of the network environment. The break events may be labeled 1-500 or the like. For example, at 340, in response to break events labeled 1-100 being generated, system 1 breaks and may no longer function effectively. The ineffective, or broken, system 1 may affect other systems, such as API C of FIG. 1 or the like. In contrast to system 1's response to break events 1-100, system 1's response (345) to break events labeled 100 plus (+) may be no response, or, in other words, the break event has no effect on the functioning of the computer-implemented processes in system 1. The "no effect" response may be interpreted as indicating that system 1 and the computer-implemented processes in system 1 are immune to break events labeled 100 plus, but which may break other systems, such as system A or computer-implemented processes, such as API C.

The simulation results 300 may also include system 1's reaction to the simulated implementation of the fix event of the located final response strategy. As with the number of break events, there may be many fix events that correct or cure a process volatility associated with a break event flag. For example, when referring to a fix event result, "correct" or "cure" does not mean that the process volatility was completely eliminated, but rather the process volatility was reduced to a level, state or status (e.g., within a guardrail) that allowed system 1 or the computer-implemented process in system 1 to return to a level, status or state of performance or process health that enables system 1 to function within expected requirements.

In the example at 350, the system 1 reaction to Fix Events 1-100 may be no effect. "No effect" meaning that implementation of the located final response strategy as a fix event did not correct or cure the process volatility indicated by the respective break event or break event flag.

Returning to the simulation results 300, another fix event may be implemented in system 1. In this case, the result at 355 is that system 1 reacts to Fix Event 101 by breaking. This result at 355 indicates that fix event 101 has an adverse effect on system 1 and likely requires additional simulation and evaluation. At 360, the results of the implementation of fix event 10 may be an improved state system 1 reaction to Fix Event 102. The "improved state" response or result at 360 may indicate that a software patch correction to the programming code cured the root cause of the break event.

The above simulation results 340-360 may be determined by evaluating a risk matrix containing risk and robustness scores related to system 1 (described in more detail with reference to FIG. 4 below). However, the above described processes and examples may be extended to provide further evaluations and system improvements for systems that may not have runbooks. The simulation is based the risk matrix. The simulation may be extended to other systems such as system A (also described in more detail with reference to FIG. 4 below). For example, risk and robustness scoring may be generated that quantifies a likelihood that system 1 is similar enough to System A that system 1's fix can also fix System A even though System A may not have an automated runbook. Even though system 1 and A are different systems, a simulation may be constructed to determine a likelihood that what is known to break system 1 may also likely break system A.

Such a simulation may include building a simulation profile for system A that shows system A was broken by the same break events that broke system 1. For example, by comparing those same break events to the library of Fix Events in a runbook library, a profile of system A that indicates that system A might break in a manner similar (e.g., 80%, 90% or greater) to system 1. For example, system A may break in response to maybe 88%-99% of the same break events that broke system 1. Using this information, simulation processing component (described with respect to FIG. 4 below) may begin simulating the application of fix events from system 1's runbook to system A. If any percentage of the fix events from system 1's runbook works, those fixe events may be stored as automated fixes for system A. As a result, the identification of the break events and corresponding fix events has been automated and manual effort to identify fix events that correspond to break events is significantly reduced. In addition, errors due to fatigue, and/or human input errors (e.g., omissions, transpositions and the like) are further reduced. The overall system and network environment is improved because system A becomes more robust because of the simulation.

Figure 4:
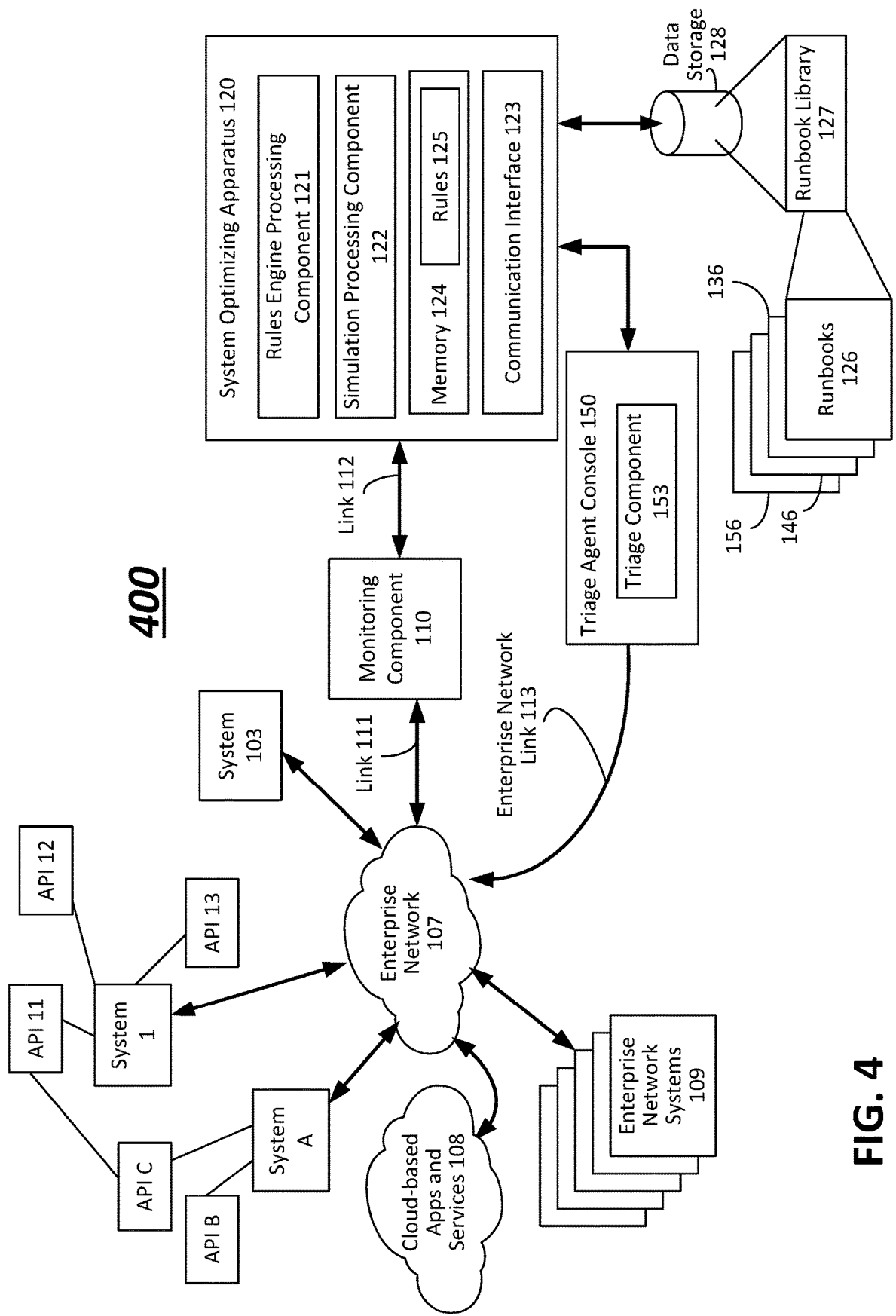
FIG. 4 illustrates an example of a network environment incorporating an example of the system optimizing apparatus described with reference to the examples of FIGS. 1-3.

The above simulation may also be applied to other systems such as system 103, cloud-based apps and services 108, enterprise network systems 109, or event APIs B, C and 11-13 (as shown in FIG. 4 and described below). For example, another simulation may be run using system 1's break/fix events but as applied to system 103. As a result of the simulation, system 103 may become more robust even though some manual corrections may be needed to fix the causes of break events not now automated due to the results of the simulation.

With the above references to system elements, it may be helpful to describe a system example that illustrates the coupling between the different component and computer-implemented processes mentioned above. FIG. 4 illustrates an example of a network environment incorporating an example of the system optimizing apparatus described with reference to the examples of FIGS. 1-3.

The system 400 may include an enterprise network 107 to which are coupled various system components, such as systems 1, A, 103 and enterprise network systems 109, and cloud-based computer applications (i.e., apps) and services 108. The monitoring component 110 may monitor operation of network systems 1, A and 103, the enterprise network systems 109 and the cloud-based apps and services 108 and may be configured to provide process health information of each computer-implemented process of the plurality of computer-implemented processes of the monitored network systems, APIs, cloud-based apps and services, and the like. The systems 1 and A may have APIs coupled to them that allow other systems to obtain one or more services or access to applications from systems 1 and A. For example, as mentioned with reference to FIG. 1 above, system 1 may be coupled to APIs 11, 12 and 13, while system A may be coupled to APIs B and C.

The monitoring component 110 may monitor operations or performance of computer-implemented process functions observable at run time of the network systems 1, A and 103, the enterprise network systems 109 and the cloud-based apps and services 108. The monitoring component 110 may include one or more computer process monitoring software or systems, such as those provided by Pagerduty, Zabbix, Datadog, Apica systems or the like.

The monitoring component 110 may assist with log management, application performance management (APM), system monitoring and web monitoring as well as ticketing tools or deployment tools. The monitoring tools 110 may monitor systems, such as System 1, System A, 103, 109, APIs, such as API 11-13, API C and API B, servers, enterprise cloud performance, application performance and service performance, such as 108, and the like coupled the network via link 111. For example, the tools may monitor server performance, server availability, and server configuration changes. Aspects of system and computer-implemented process performance that may be monitored may include high processor or memory usage, packet loss, interface errors, low core router throughput, abnormal normal TCP connections, network bandwidth usage, or the like.

Returning to the example of FIG. 4, each of the one more computer processing monitoring software or systems of the monitoring component 110 may output a break event indicating a symptom of a potential operational breakdown of one or more computer-implemented processes that are being monitored. A break event may be a flag or other data string output by the respective computer process monitoring software or system. For example, monitoring component 110 may be monitoring the process health of system 1 and in response to a computer-implemented process of system 1 infringing a guardrail The monitoring component 110 may be coupled to a system optimizing apparatus 120. The system optimizing apparatus 120 may be coupled to data storage 128 and a triage agent console 150.

The system optimizing apparatus 120 may also be configured to evaluate past performance to optimize responses and evaluation by the simulation processing component. For example, after performing the example processes and functions described with reference to FIG. 1 and in the examples of FIGS. 2A and 2B, the system optimizing apparatus 120 may have access to previously-stored computer-implemented process status information output from the monitoring component 110 as well as the simulation processing component 122 and the rules engine processing component 121. The rules 125 may be used to determine which break events affect system performance and health, and increasingly correlate those break events that indicate a process volatility that affects system performance and health to fix events that most effectively correct those break events.

The system optimizing apparatus 120 may utilize a rules engine (configured in hardware, firmware, software or a combination of each) that may be configured to account for interdependencies between large numbers of computer applications in an enterprise (e.g., upwards of 2000 in some enterprises) and an even larger number of application programming interfaces (API), which may be upwards of 20,000 APIs in some enterprises, that operate throughout an enterprise network environment. The rules engine can run on its own and learn from itself, it may use statistical learning or machine learning to self-optimize. The system optimizing apparatus 120 may execute a rules engine that utilizes rules 125 to assist in the determination of correlations between the Break and Fix Events, generation of a scoring matrix (containing elements related to different system attributes, such as a risk attribute score, robustness attribute score, a Security Threat score, or other scored attributes) using the determined correlations, and determining an optimal fix (also referred to as a fix event, a corrective action, and response strategy) to the indicated breakages.

In FIG. 4, the system optimizing apparatus 120 may include rules engine processing component 121, simulation processing component 122, memory 124, and a communication interface 123. The rules engine processing component 121, the simulation processing component 122, the communication interface 123, and the memory 124 may be coupled to one another as the system optimizing apparatus 120. The system optimizing apparatus 120 may be coupled via the communication interface 123 and link 112 with the monitoring component 110. The system optimizing apparatus 120 may also be coupled to the data storage 128 and the triage agent console 150 via the communication interface 123. In some examples, the system optimizing apparatus 120 may be a processing system that is implemented using one or more servers or computing devices that are interconnected via one or more network links, e.g., wired, wireless, fiber, or the like.

It may be helpful to briefly describe an operational example in the context of a single break event with reference to FIG. 4. In an example, the simulation processing component 122 may be configured to generate a simulated instance of a network environment. The simulated instance may include all computer processes in the network environment, such as systems A, 1, 103, the cloud-based apps and services 108 and the enterprise network systems 109 or may only include a subset of all computer processes in the network environment, such as only the cloud-based apps and services 108. For example, it may be desired to determine the effects of a degraded computer-implemented process occurring in API 13. As an initial step, the status of the simulated network environment may be determined by generating a pre-breakage snapshot of all computer processes in the simulated instance of the network environment using monitoring data provided by the monitoring component 110. The pre-breakage snapshot generated by the simulation processing component 122 is a collection of process health values of each computer-implemented process. The pre-breakage snapshot may include, for example, a robustness score indicating a process health of each computer-implemented process of the plurality of computer-implemented processes, and a risk score indicating a threshold between automated correction and manual correction of a degrading system. The robustness scores and the risk scores may be generated by the rules engine processing component 121, the simulation processing component 122 or both.

In the simulated instance of the network environment, a break event for a computer-implemented process under test, such as, for example, API 13 may be generated as a simulated break event by the simulation processing component 122. The generated break event (that may be referred to as the simulated break event) may indicate a process volatility occurring in API 13, which in this example is the computer-implemented process under test.

Using API 13 in an example, the simulation processing component may select a process volatility (e.g., failure to connect to system 1, loss of data when connecting to system 1, or the like) having an assigned break event risk assessment value for simulation with respect to API 13. The simulation processing component 122 may identify a break event flag corresponding to the selected process volatility for input into the simulated network environment. The selected process volatility may be assigned a break event risk assessment value ranging from a value indicating the process volatility has a high likelihood, such as 80%, 60% or the like, of causing a process break to a value indicating the process volatility has a low likelihood, such as 20%, 40% or the like of causing a process break.

In response to the simulated break event, the simulation processing component 122 may generate a simulation result snapshot. The simulation result snapshot may be a collection of simulation-responsive process health values of each of the plurality of computer-implemented processes including an updated robustness score and an updated risk score.

During the simulation, the simulation processing component 122 may receive a final response from the rules engine processing component 121 that cures the process volatility occurring in the computer-implemented process under test. The simulation processing component 122 may apply the final response to the simulated instance of the network environment to cure the simulated break event.

In response to application of final response in the simulated instance of the network environment, the simulation processing component 122 may generate a cure result snapshot. The cure result snapshot may be a collection of cure-responsive process health values of each of the plurality of computer-implemented processes including a cure-related robustness score and a cure-related risk score that may provide a view into how the applied final response affected API 13 and other computer-implemented processes in the simulated instance of the network environment.

While the different snapshots (e.g., pre-breakage, simulation result and cure result) may be obtained at discrete times, a snapshot of a production instance (i.e., current operating status of the network environment that is being provided by users) working of the network environment may be periodically generated based on information, such as indicators of process health including alerts and the like, processor and/or memory usage information, time-related statistical information, such as operations per minute or transactions per minute or the like, and the like, received from the monitoring component 110 for use in a simulated instance of a network environment. The simulation processing component 122 may set the health status of the computer implemented processes in the simulation to the settings of the production instance shown in the snapshot of the production instance of the network environment. In such an example, the pre-breakage snapshot may be a periodic snapshot taken prior to the simulation processing component generating the simulation instance of the network environment.

The rules engine processing component 121 may include a processor or other logic component that may be programmed with or able to access programming code (e.g., computer-readable or machine-readable code), that configures the rules engine processing component 121 to perform functions. For example, the rules engine processing component 121 may access in the runbook library 127 a specific runbook, such as 136, associated with the computer-implemented process under test from the runbook library 127. The specific runbook, such as 136, may contain respective final responses for a plurality of process volatilities, such as the process volatility selected to be the cause of the generated break event for API 13 in the example, having potential to occur in API 13, the computer-implemented process under test. The simulation processing component 122 may select from the respective final responses in the specific runbook the final response that cures the simulated break event (of API 13 in the example) and forward the final response to be received by the simulation processing component. The rules engine processing component 121 may evaluate the pre-breakage snapshot, the simulation result snapshot, and the cure result snapshot with reference to one another. Based on a result of the evaluation, the rules engine processing component 121 may identify a network environment architecture as an optimal network architecture that cures the process volatility of the computer-implemented process under test. The optimal network architecture may have a below-threshold risk score for each of the plurality of computer-implemented processes of the network environment (e.g., a low likelihood of causing a break in API 13, the computer implemented process in the example, as well as other computer-implemented processes) and an above-threshold robustness score for each of the plurality of computer-implemented processes of the network environment (e.g., a high likelihood of continued operation of API 13, the computer implemented process in the example as well as other computer-implemented processes). In the example, in response to API 13 being cured or corrected, the specific runbook (e.g. 136) for API 13 (or the computer-implemented process under test) and other runbooks (e.g. 126, 146 and 156) in the runbook library 127 may be modified based on the identified optimal network architecture to achieve the below-threshold risk score for each of the plurality of computer-implemented processes operated by the enterprise and the above-threshold robustness score for each of the plurality of computer-implemented processes operating in the network environment (which includes enterprise network 107 and the connected systems A, 1, 103, 109 and cloud-based apps and services 108).

There may be times, when the risk scores or robustness scores become so poor that a system outage (e.g., a system is completely unavailable for an intended purpose) may be the result and user intervention is required. A triage agent console 150 may facilitate the user intervention and be coupled to the system optimizing apparatus 120. The triage agent console 150 may be coupled to triage component 153 may include user input device and a monitor. The monitor may present a graphical user interface that presents a graphical representation of the optimal network architecture that cures the process volatility of the computer-implemented process under test. The triage agent console 150 includes a connection to a production instance of the network environment that includes network 107, systems A, 1, 103 and 108 and the cloud-based apps and services 108 via an enterprise network link 113. The triage component 153 may be coupled to a production instance of the network environment via the enterprise network link 113 and to the runbook library 127 via a communication interface 123. The triage component 153 may include processing component configured to access, via the communication interface 123, the modified specific runbook (e.g., 136) and other runbooks (e.g., 126, 146 or 156) in the runbook library 127.

In the example of FIG. 4, the rules engine processing component 121 and the simulation processing component 122 may be one or more processors that include one or more processing cores that process information and data. Moreover, the rules processing component 121 and the simulation processing component 122 may include one or more processing devices, such as a microprocessor manufactured by Intel™, AMD™, or any of various processors.

The rules engine processing component 121 may access the rules 125 in memory 124 and execute a rules engine that performs the functions as described in more detail with reference to other examples. For example, the rules engine processing component 121 may evaluate a risk-robustness matrix by applying the rules stored in rules 125 and identify any pathway or pattern that leads to a single root cause for a break event that can be automatically fixed or corrected.

The memory 124 may include one or more memory (volatile or non-volatile) devices configured to store instructions used by the rules processing component 121, the simulation processing component 122, or both to perform one or more operations consistent with the disclosed examples. For example, memory 124 may be configured with one or more software instructions, such as computer readable program code that can perform one or more operations when executed by the rules processing component 121 and the simulation processing component 122. Of course, the disclosed program code is not limited to separate programs or computers configured to perform dedicated tasks. For example, memory 124 can include a single program or multiple computer programs that perform the disclosed operations.

Memory 124 can also store data that can reflect any type of information in any format that the system can use to perform operations consistent with the disclosed examples. For example, the memory 124 may store rules 125. The rules 125 may be applied as described in the disclosed examples to received break events and identified fix events to produce an optimal network architecture.

In the example, the system optimizing apparatus 120 may couple to a data storage 128. The data storage 128 may include hard disk drives, flash memory devices, optical storage devices, floppy storage devices, and the like. In some instances, the data storage 128 may include cloud-based storage devices that may be accessed via the communication interface 123. In some examples, the data storage 128 may be configured to store one or more databases and/or as a distributed database system to store information and data. An example of the one or more databases may be a runbook library 127. The runbook library 127 may include several different runbooks 126-156 specific to each of the network systems 1, A and 103, the cloud-based apps and services 108, and the enterprise network systems 109. Each of the network systems 1, A and 103, the cloud-based apps and services 108, and the enterprise network systems 109 has a runbook for the respective computer processes within each respective system. Each runbook 126-156 in the runbook library 127 may be a list of procedures for implementing possible corrective actions to the one or more computer-implemented processes. For example, network system 103 may have hundreds of computer processes executing, and each computer process may have a runbook with a list of procedures for implementing fixes, corrective actions or response strategies, to fix root causes of actual or potential operational breakdowns of the one or more computer-implemented processes. The runbooks 126-156 stored in the runbook library 127 may be relatively static with only intermittent or periodic updating. Alternatively, the runbooks 126-156 may be updated continuously. While only 4 runbooks 126-156 are shown in runbook library 127 for ease of illustration and description, the runbook library 127 may include hundreds or thousands of runbooks that may correspond to each of the respective thousands of systems and tens of thousands of APIs in a network environment.

An optimal corrective action is a response or response strategy that corrects the root cause of the break event indication with minimal effects on other computer processes within the same network system and with minimal effects on computer processes in any other network systems. The risk matrix used to generate the risk matrix runbook 129 may an evolution of the rules 125 that begins on an initial day (i.e., Day 1) and continues indefinitely as the rules engine processing component 121 is self-optimized and automation brings in an ever-greater library of runbooks. The optimal corrective action may indicate an optimal network architecture when the robustness scores of all or substantially all the computer-implemented processes are within their respective guardrails and the risk scores of all or substantially all the computer-implemented processes do not exceed their respective guardrails (indicating a high likelihood of risk of breakage to a respective system).

The communication interface 123 include one or more digital and/or analog communication devices that allow the simulation processing component 122 to communicate with other machines and devices, such the monitoring component 110 via a link 112 and the enterprise network via enterprise network link 121. The communication interface 123 may be configured to communicate via any type of connection, e.g., wired, wireless, optical, or the like. These communication interface 123 may include network adapters and/or modems to communicate with the enterprise network 107 and monitoring component 110.

As a monitoring system, such as the monitoring component described with reference to FIG. 1 monitors the computer processes, some of the computer processes may begin to degrade or fail. At a certain point, as the computer process begins to degrade, the monitoring circuit break events indicate that the exceed guardrails and go from "working" to "failing." For most organizations, this definition is some measure of a quantitative metric, like latency or some other term in a service level agreement, for example, that is time or alerts within a timeframe based. This guardrail, or threshold, between "working" and "failing" is a critical time in the performance of the system since most computer processes within the network environment are interdependent on other computer processes within the network environment. When a failure begins, there is an exponential risk that upstream and downstream systems may begin to break as well. This chain of up and downstream systems may be referred to as "interdependency."

A monitoring system may have threshold settings, or guardrails, against which the monitoring circuit compares a measurement of a process attribute being monitored to a number of different thresholds or guardrails, such as an ALERT, which means that the computer process is experiencing a fault but is still working with an acceptable performance level, or FAILING, which means performance is no longer working at an acceptable performance level. In response to a measurement related to a computer process exceeding a guardrail, the monitoring circuit may generate a break event. The break event may be indicative of an ALERT or FAILING performance measurement. As the monitoring circuit continues to monitor the process that caused the initiation of the break event, the monitoring circuit may continue to compare the measurement of the process attribute to see if, yet another guardrail is exceeded. Each of the respective guardrails may indicate an increased severity, or urgency, the computer process's status with respect to potential failure, breakdown or another operational fault. In contrast to a break event, a fix event is an indication, a flag or even an address of corrective action that will correct a process experiencing a break event, or fix the cause of the break event, multiple unrelated break events (e.g., restart system) or multiple related break events.

A break risk assessment value may be a value indicating a probability that a computer for which a break event has issued will break. For example, the assigned break event risk assessment value ranges from a value indicating the operational breakdown has a high likelihood of occurring to a value indicating the operation breakdown has a low likelihood of occurring. The fix event risk assessment may be a value indicating a probability that a computer for which a break event has issued will be fixed or corrected by an identified corrective action or fix. For example, the respective fix event risk assessment value assigned to each of the identified possible corrective action may range from a value indicating the operational breakdown has a high likelihood of being fixed to a value indicating the operation breakdown has a low likelihood of being fixed by the respective identified possible corrective action.

Interdependent systems complicate break-fix stability and other network quality attributes. As network and system complexity increases, the definition of a process "working" and being "broken" may get blurred as does the visibility of past break-fix events as they correlate to any present event. In some examples, the risk matrix populated with the assigned break event risk assessment value and the fix event risk assessment value assigned for each of the identified corrective actions may be evaluated by identifying interdependency risk patterns in the risk matrix. For example, the identified interdependency risk patterns may indicate risks related to responses in the runbook and effects of implementing response on respective computer-implemented processes in the network environment. The risk patterns may be analyzed with respect to rules, such as rules 125 in FIG. 1 by the system optimizing apparatus, to determine an interdependency rating, e.g., a value ranging from 1-100, 0.00 to 1.00, 100-1000 or the like, that quantifies a level of interdependence of each computer-implemented process on one another in the network that may be affected by application of each of the possible responses in the list of possible responses.

The results of the simulations may enable further updates to the runbooks 126-156 of the runbook library 127 and to the risk matrix runbook 129. For example, the system optimizing apparatus 120 may produce a simulation copy of the generated risk assessment matrix and simulation copy of the modified runbook, both of which may be stored in data storage as part of the risk matrix runbook 129, the runbook library 127 or in a separate location of the data storage 128. Simulated process breaks may be obtained by the system optimizing apparatus 120 as received process break events. Break risk assessment values and fix risk assessment values of the successive break events determine based on the simulated process break events. The copy of the generated risk assessment matrix is populated by the system optimizing apparatus 120 using the determine break risk assessment values and fix risk assessment values from the simulation results to produce a revised risk assessment matrix.

As mentioned above, a non-functional process requirement or process attribute, may include cost optimization, operational excellence, process stability, process security, threat indicator, process fragility, process usability, process performance efficiency, process response time, reliability resilience, or the like, of the computer-implemented process. For example, process stability in the network environment may be one non-functional process attribute that the system optimizing apparatus may attempt to control or respond to changes of, the process attribute or attributes. Operability or Usability are examples of non-functional process attributes and the system optimizing apparatus may control or respond to changes of the system that affect these non-functional process attributes. More specifically, operational excellence may be defined as an ability to run and monitor systems to deliver business value and to continually improve supporting processes and procedures. Security may be defined as an ability to protect information, systems, and assets while delivering business value through risk assessments and mitigation strategies. Reliability may be defined as an ability of a system to recover from infrastructure or service disruptions, dynamically acquire computing resources to meet demand, and mitigate disruptions such as misconfigurations or transient network issues. Performance efficiency may be defined as an ability to use computing resources efficiently to meet system requirements, and to maintain that efficiency as demand changes and technologies evolve. Process fragility may be a measure of a system's likelihood to break in normal operations. A threat indicator may be a measure of the system's probability to be compromised by a security flaw exposed through a break event. While cost optimization may be defined as an ability to run systems to deliver business value, for example, at the lowest price point.

While the examples in the FIGS. 1-4 above and 5 below, refer to details of robustness as an example, any other non-functional requirement or process attribute, such as those mentioned above, may also be analyzed instead of or in combination with robustness. Therefore, the scope of the disclosure is not being limited to only risk and robustness, but also includes risk and any other non-functional requirement or attribute. The described techniques may be used to evaluate a system with respect to any non-functional requirement such as operational excellence, process security, reliability, performance efficiency, cost optimization, or the like. The parameters may be different for each non-functional requirement, but the above described processes may be used with a non-functional requirement score. In an example, the data structure (e.g., risk matrix) may be populated with parameters that are different for each non-functional requirement. For example, the cost optimization parameters may be different from the parameters for process fragility. When a specific non-functional requirement is selected for evaluation or test, a component of the system, such as the system optimizing apparatus 120 of FIG. 4, may select the parameters that are to be used with the risk matrix for the selected non-functional requirement. The parameters may be used with the risk matrix to normalize the data with respect to the selected non-functional requirement being evaluated or tested.

For example, the described techniques may be applied to 1000s to an infinite number of technological systems (e.g., computer-implemented processes and the like) and using the described techniques and systems provide a capability to identify what breaks those technological systems, what fixes those technological systems, and what those technological systems look like while breaking. With the described techniques, systems and capability when a new system comes into use, the new system may be simulated to find out which previously broken and subsequently fixed system it most resembles in normal, breaking, repairing, and broken state. In the examples, the robustness score may be replaced with a non-functional requirement score. The non-functional requirement score may be a score related to one or more non-functional requirements of: cost optimization, operational excellence, process stability, process security, threat indicator, process fragility, process usability, process performance efficiency, process response time, reliability resilience or the like. For example, the non-functional requirement score for each respective computer-implemented process may be based on the identified break event symptom, the computing environment indicator, the code environment indicator, the respective break event symptom corresponding to the respective computer-implemented process and the response strategy corresponding to the respective break event symptom of the respective computer-implemented process for one or more non-functional requirements.

Figure 5:
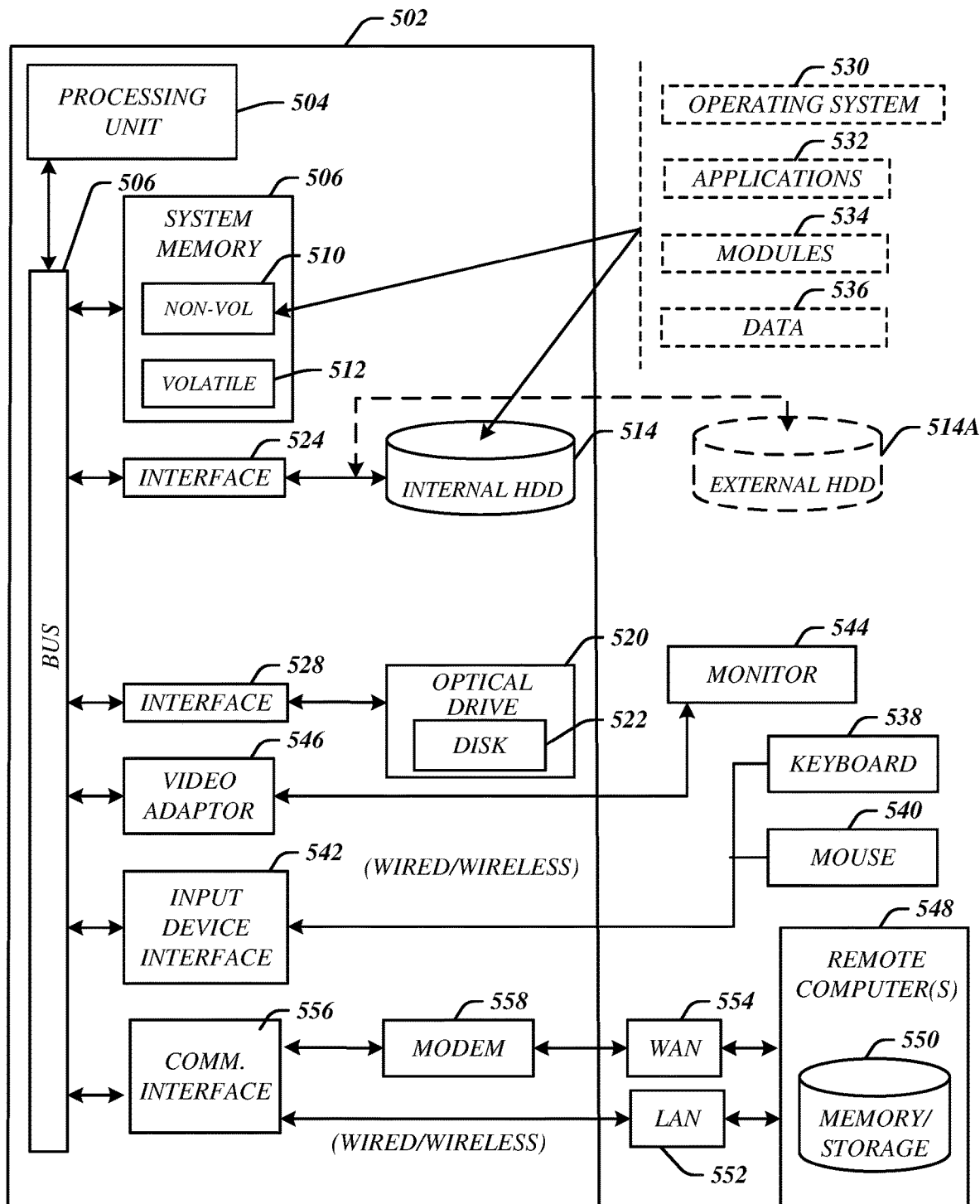
FIG. 5 illustrates an embodiment of an exemplary computing architecture suitable for implementing the devices and systems described with respect to FIGS. 1-4.

FIG. 5 illustrates an embodiment of an exemplary computing architecture 500 suitable for implementing various embodiments as previously described. In one example, the computing architecture 500 may include or be implemented as part of system 100 or 400. In another example, the computer architecture 500 include components of a system optimizing apparatus as well as other components that may optionally be part of the system optimizing apparatus.

As used in this application, the terms "system" and "component" are intended to refer to a computer-related entity, either hardware, a combination of hardware and software, software, or software in execution, examples of which are provided by the exemplary computing architecture 500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server or a processor and the server or the processor can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 500.

As shown in FIG. 5, the computer architecture 500 includes a processing unit 504, a system memory 506 and a system bus 508. The processing unit 504 can be any of various commercially available processors. The system optimizing apparatus 120 of FIG. 3 may incorporate one or more of the components of the computer architecture 500, such as the processing unit 504, the system memory 506 and so on. Other components, such as the keyboard 538 and the mouse 540, may be omitted in some examples, but may be used in components such as the triage processing console 150 or the like. Similarly, the rules engine processing component 121, simulation processing component 122 or other elements of the system optimizing apparatus 120 may include some or all of the components of the computing architecture 500.

The system bus 508 provides an interface for system components including, but not limited to, the system memory 506 to the processing unit 504. The system bus 508 can be any of several types of bus structure that may further interconnect to a memory bus (with or without a memory controller), a peripheral bus, and a local bus using any of a variety of commercially available bus architectures. Interface adapters may connect to the system bus 508 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 500 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 5, the system memory 506 can include non-volatile memory 510 and/or volatile memory 512. A basic input/output system (BIOS) can be stored in the non-volatile memory 510.

The computer 502 may include various types of computer-readable storage media in the form of one or more lower speed memory units, including an internal (or external) hard disk drive (HDD) 514 or 514A, and an optical disk drive 520 to read from or write to a removable optical disk 522 (e.g., a CD-ROM or DVD). The HDD 514 and optical disk drive 520 can be connected to the system bus 508 by a HDD interface 524 and an optical drive interface 528, respectively. The HDD interface 524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, several program modules can be stored in the drives and memory units 510, 512, including an operating system 530, one or more application programs 532, other program modules 534, and program data 536. In one embodiment, the one or more application programs 532, other program modules 534, and program data 536 can include, for example, the various applications and/or components of the system 700.

A user can enter commands and information into the computer 502 through one or more wire/wireless input devices, for example, a keyboard 538 and a pointing device, such as a mouse 540. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 504 through an input device interface 542 that is coupled to the system bus 508 but can be connected by other interfaces such as a parallel port, IEEE 1394 serial port, a game port, a USB port, an IR interface, and so forth.

A monitor 544 or other type of display device is also connected to the system bus 508 via an interface, such as a video adaptor 546. The monitor 544 may be internal or external to the computer 502. In addition to the monitor 544, a computer typically includes other peripheral output devices, such as speakers, printers, and so forth.

The computer 502 may operate in a networked environment using logical connections via wire and/or wireless communications to one or more remote computers, such as a remote computer 548. The remote computer 548 can be a workstation, a server computer, a router, a personal computer, portable computer, microprocessor-based entertainment appliance, a peer device or other common network node, and typically includes many or all the elements described relative to the computer 502, although, for purposes of brevity, only a memory/storage device 550 is illustrated. The logical connections depicted include wire/wireless connectivity to a local area network (LAN) 552 and/or larger networks, for example, a wide area network (WAN) 554. Such LAN and WAN networking environments are commonplace in offices and companies, and facilitate enterprise-wide computer networks, such as intranets, all of which may connect to a global communications network, for example, the Internet.

For example, the rules engine processing component 121 implemented according to the example of FIG. 3 may identify, through the risk matrix, any pathway or pattern that leads to a single root cause for a break event that can be automatically fixed or corrected. As described in the examples of FIGS. 1-3, the application of risk scoring and robustness scoring to indicate process health of a computer-implemented process is an improvement because the use of risk scoring and robustness scoring enables the identification of an optimal computer architecture that may the system to invoke a user gateway, for example, via the triage agent console, using for example a computer application stored in applications memory 532 or any one of the internal HDD 514 or external HDD 514A, usable to implements the hardware and process examples described with reference to FIGS. 1-2B above.

When used in a LAN networking environment, the computer 502 is connected to the LAN 552 through a wire and/or wireless communication interface 556. The communication interface 556 can facilitate wire and/or wireless communications to the LAN 552, which may also include a wireless access point disposed thereon for communicating with the wireless functionality of the communication interface 556.

When used in a WAN networking environment, the computer 502 can include a modem 558, or is connected to a communications server on the WAN 554 or has other means for establishing communications over the WAN 554, such as by way of the Internet. The modem 558, which can be internal or external and a wire and/or wireless device, connects to the system bus 508 via the input device interface 542. In a networked environment, program modules depicted relative to the computer 502, or portions thereof, can be stored in the remote memory/storage device 550. It will be appreciated that the network connections shown in FIG. 5 (as well as 111-113 of FIG. 4) are exemplary and other means of establishing a communications link between the computers can be used.

The computer 502 is operable to communicate with wired and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.118 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-4 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

What is claimed is:

1. A method, comprising:
monitoring, by a monitoring component, a simulation instance of a network environment;
generating a pre-breakage snapshot of a process health of each computer-implemented process of a plurality of computer-implemented processes, wherein the pre-breakage snapshot, for each computer-implemented process of the plurality of computer-implemented processes, includes:
a non-functional requirement score indicating the process health of each computer-implemented process of the plurality of computer-implemented processes, and
a risk score indicating a threshold between automated correction and manual correction of a degrading system;
generating, by a simulation processing component executing the simulation instance, a simulated break event flag indicating a process volatility in a test computer-implemented process from the plurality of computer-implemented processes;
generating, by the monitoring component in response to the simulated break event flag generated by the simulation processing component, a simulation result snapshot of process health of each of the plurality of computer-implemented processes, wherein the simulation result snapshot includes an updated non-functional requirement score and an updated risk score for each computer-implemented process of the plurality of computer-implemented processes;
accessing, by a rules engine, a library of runbooks, wherein:
each runbook in the library of runbooks addresses a respective computer-implemented process of the plurality of computer-implemented processes operating in the network environment;
identifying, based on the simulated break event flag, a specific runbook in the library of runbooks;
selecting a located final response strategy to cure the process volatility indicated by the simulated break event flag of the test computer-implemented process to be implemented in the simulation instance of the network environment;

simulating implementation of the located final response strategy in the simulation instance of the network environment to cure the indicated process volatility of the test computer-implemented process;

generating, by the monitoring component in response to the simulated implementation of the located final response strategy, a cure result snapshot of process health of each of the plurality of computer-implemented processes;

evaluating the pre-breakage snapshot, the simulation result snapshot, and the cure result snapshot with reference to one another; and based on results of the evaluation, identifying a network environment architecture as an optimal network architecture that cures the process volatility of the test computer-implemented process.

2. The method of claim 1, wherein the non-functional requirement score is a score related to one or more non-functional requirements of: cost optimization, operational excellence, process stability, process security, threat indicator, process fragility, process usability, process performance efficiency, process response time, or reliability resilience.

3. The method of claim 1, wherein generating the pre-breakage snapshot comprises:

receiving, from the monitoring component coupled to each of the computer-implemented processes in the plurality of computer-implemented processes, a list of break event flags for each computer-implemented process of the plurality of computer-implemented processes;

identifying respective break event symptoms for each break event flag in the list of break event flags;

generating, for each identified respective break event symptom, a computing environment indicator, a code environment indicator, and a response strategy corresponding to the respective break event symptom;

generating, by the rules engine, a non-functional requirement score for each respective computer-implemented process of the plurality of computer-implemented processes, wherein the generated non-functional requirement score for each respective computer-implemented process is based on the identified respective break event symptom corresponding to the respective computer-implemented process and the response strategy corresponding to the respective break event symptom of the respective computer-implemented process;

generating, by the rules engine, a risk score for each computer-implemented process of the plurality of computer-implemented processes based on the identified respective break event symptom of the respective computer-implemented process, and the response strategy corresponding to the identified respective break event symptom; and storing the generated non-functional requirement and risk scores of each computer-implemented process with a timestamp of when the pre-breakage snapshot was taken in a data structure.

4. The method of claim 1, wherein generating the simulation result snapshot after application of located final response comprises:

in response to application of the process volatility indicated by the generated simulation break event flag to the simulation instance of the network environment, generating based on inputs received from the monitoring component a list of break event flags for each computer-implemented process of the plurality of computer-implemented processes, wherein the monitoring component monitors the simulation instance via a coupling to each of the computer-implemented processes in the plurality of computer-implemented processes;

identifying respective break event symptoms for the break event flags in the list of break event flags;

determining, for each identified respective break event symptom, a computing environment indicator corresponding to the identified respective break event symptom, a code environment indicator corresponding to the identified respective break event symptom, and a final response strategy corresponding to the identified respective break event symptom;

storing, for each identified respective break event symptom, the identified respective break event symptom, the determined computing environment indicator, the determined code environment indicator and determined final response strategy into a data structure;

generating, by the rules engine, the updated non-functional requirement score for each respective computer-implemented process of the plurality of computer-implemented processes based on the identified respective break event symptom, the determined computing environment indicator, the determined code environment indicator, and the final response strategy corresponding to the identified respective break event symptom of the respective computer-implemented process;

generating, by the rules engine, the updated risk score for each computer-implemented process of the plurality of computer-implemented processes based on the identified break event symptom and the final response strategy corresponding to the break event symptom of the respective computer-implemented process; and storing the updated non-functional requirement score and the updated risk score of each computer-implemented process with a timestamp indicating when the simulation result snapshot was taken in the data structure.

5. The method of claim 1, further comprising:

in response to simulating implementation of the located final response in the simulation instance of the network environment, generating a modified non-functional requirement score of the updated non-functional requirement score and a modified risk score of the updated risk score for each computer-implemented process of the plurality of computer-implemented processes; and storing each of the modified non-functional requirement scores and each of the modified risk scores in the cure result snapshot.

6. The method of claim 1, wherein evaluating the pre-breakage snapshot, the simulation result snapshot, and the cure result snapshot with reference to one another; comprises:

identifying score changes of non-functional requirement scores and risk scores between the pre-breakage snapshot and the simulation result snapshot, and changes in non-functional requirement scores and risk scores between the simulation result snapshot and the cure result snapshot for each respective computer-implemented process;

recognizing, by evaluating the identified score changes by the rules engine, interdependencies between each respective computer-implemented process in the plurality of computer-implemented processes; and in response to the recognized interdependencies, identifying an operating state of each respective computer-implemented process in the plurality of computer-implemented processes that provides a below threshold risk score for each respective computer-implemented process and an above threshold-non-functional requirement score for each respective computer-implemented process.

7. The method of claim 1, wherein:
the simulation break event flag is generated by the simulation component based on a risk assessment value assigned to the process volatility, wherein the risk assessment value has a range from a value indicating the process volatility has a high likelihood of causing a process break of the simulated computer-implemented process to a value indicating the process volatility has a low likelihood of causing a process break of the simulated computer-implemented process.

8. A system, comprising:
a simulation processing component operable to perform simulations related to a network environment;
a monitoring component coupled to the simulation processing component, wherein the monitoring component is operable to provide process health information of each computer-implemented process of a plurality of computer-implemented processes;
a runbook library that stores runbooks corresponding to the plurality of computer-implemented processes; and
a rules engine processing component coupled to the monitoring component, the simulation processing component and the runbook library,
wherein the simulation processing component is further operable to:
  simulate an instance of the network environment;
  generate in the simulated instance of the network environment a simulated break event for a computer-implemented process under test, the simulated break event indicating a process volatility occurring in the computer-implemented process under test;
  apply a final response to the simulated instance of the network environment to cure the process volatility indicated by the simulated break event;
  generate, based on monitoring information provided by the monitoring component, a pre-breakage snapshot, wherein the pre-breakage snapshot includes:
    a non-functional requirement score indicating a process health of each computer-implemented process, and
    a risk score indicating a threshold between automated correction and manual correction of a degrading system;
  in response to the simulated break event, generate a simulation result snapshot, wherein the simulation result snapshot includes an updated non-functional requirement score and an updated risk score; and
  in response to application of the final response, generate a cure result snapshot, wherein the cure result snapshot includes a cure-related non-functional requirement score and a cure-related risk score; and
wherein the rules engine processing component is operable to:
  access a specific runbook associated with the computer-implemented process under test from the runbook library, the specific runbook containing respective final responses having potential to occur in the computer-implemented process under test;
  select from the respective final responses in the specific runbook the final response that cures the simulated break event;
  forward the final response to the simulation processing component;
  evaluate the pre-breakage snapshot, the simulation result snapshot, and the cure result snapshot with reference to one another; and
  based on the evaluating of the pre-breakage snapshot, the simulation result snapshot, and the cure result snapshot with reference to one another, identifying a network environment architecture as an optimal network architecture that cures the process volatility of the computer-implemented process under test.

9. The system of claim 8, wherein:
the optimal network architecture has a below-threshold risk score for each computer-implemented process of the plurality of computer-implemented processes and an above-threshold non-functional requirement score for each computer-implemented process of the plurality of computer-implemented processes; and
the rules engine processing component is further operable to:
  based on the optimal network architecture, modify the specific runbook and other runbooks in the runbook library to achieve a below-threshold risk score for each of the plurality of computer-implemented processes and an above-threshold non-functional requirement score for each of the plurality of computer-implemented processes.

10. The system of claim 8, wherein the non-functional requirement score is a score related to one or more of: cost optimization, operational excellence, process stability, process security, threat indicator, process fragility, process usability, process performance efficiency, process response time, or reliability resilience.

11. The system of claim 8, wherein the simulation processing component is further operable to:
generate the pre-breakage snapshot in response to the generation of the simulated break event flag.

12. The system of claim 8, wherein the simulation component is further operable to:
generate a snapshot of a production instance of the network environment, wherein the pre-breakage snapshot is a snapshot taken prior to the simulation processing component generating the simulation instance of the network environment.

13. The system of claim 8, wherein the simulation processing component is further operable to:
select a process volatility occurring in the computer-implemented process under test having an assigned break event risk assessment value for simulation, wherein the selected process volatility is assigned a break event risk assessment value ranging from a value indicating the process volatility has a high likelihood of causing a process break to a value indicating the process volatility has a low likelihood of causing a process break; and
identify a break event flag corresponding to the selected process volatility for input into the simulated network environment, wherein the identified break event flag indicates occurrence of the simulated break event.

14. A non-transitory computer-readable storage medium storing computer-readable program code executable by a processor, wherein execution of the computer-readable program code causes the processor to:

generate, in response to monitoring a simulation instance of a plurality of computer-implemented processes of a network environment, a pre-breakage snapshot of a process health of each of the plurality of computer-implemented processes, wherein the pre-breakage snapshot, for each computer-implemented process of the plurality of computer-implemented processes in the simulation instance, includes:
  a non-functional requirement score indicating a process health of each computer-implemented process of the plurality of computer-implemented processes, and
  a risk score indicating a threshold between automated correction and manual correction of a degrading computer-implemented process in the simulation instance;
generate a simulated break event flag indicating a process volatility in a test computer-implemented process of a plurality of computer-implemented processes of the simulation instance;
in response to the simulated break event flag generated by a simulation processing component, generate a simulation result snapshot of process health of each of the plurality of computer-implemented processes, wherein the simulation result snapshot includes an updated non-functional requirement scores and an updated risk score for each of the plurality of computer-implemented processes;
access, via a coupling to a runbook library of the network environment, a library of runbooks addressing a respective computer-implemented process of the plurality of computer-implemented processes;
locate a response strategy in a specific runbook that cures the indicated process volatility of the test computer-implemented process;
simulate implementation of the located response strategy in the simulation instance of the network environment to cure the indicated process volatility of the test computer-implemented process;
in response to the simulated implementation of the located response strategy, generate a cure result snapshot of process health of each of the plurality of computer-implemented processes;
evaluate the pre-breakage snapshot, the simulation result snapshot, and the cure result snapshot with reference to one another; and
based on the results of the evaluation, identify an optimal network architecture that cures the process volatility of the test computer-implemented process.

15. The non-transitory computer-readable storage medium of claim 14, further comprising computer-readable program code that when executed to generate the pre-breakage snapshot causes the processor to:
  receive from each of the computer-implemented processes in the plurality of computer-implemented processes a list of break event flags for each computer-implemented process of the plurality of computer-implemented processes;
  identify respective break event symptoms for the break event flags in the list of break event flags;
  determine, for each identified respective break event symptom, a computing environment indicator corresponding to the respective break event symptom, a code environment indicator identifying the respective break event symptom, and a final response strategy that cured the respective break event symptom;
  generate a non-functional requirement score for each respective computer-implemented process of the plurality of computer-implemented processes based on the identified break event symptom, the determined computing environment indicator, the determined code environment indicator, the break event symptom corresponding to the respective computer-implemented process and the response strategy corresponding the break event symptom of the respective computer-implemented process;
  generate a risk score for each computer-implemented process of the plurality of computer-implemented processes based on the identified break event symptom, and the response strategy corresponding to the break event symptom of the respective computer-implemented process; and
  store the generated non-functional requirement and risk scores with each computer-implemented process with a time that the pre-breakage snapshot was taken in a data structure.

16. The non-transitory computer-readable storage medium of claim 14, wherein the non-functional requirement score is a score related to one or more of: cost optimization, operational excellence, process stability, process security, threat indicator, process fragility, process usability, process performance efficiency, process response time, or reliability resilience.

17. The non-transitory computer-readable storage medium of claim 14, further comprising computer-readable program code that when executed to generate the simulation result snapshot executed causes the processor to:
  in response to application of the located response strategy to the simulation instance, generate a list of break event flags for each computer-implemented process of the plurality of computer-implemented processes, wherein the list of break event flags includes a response from each of the computer-implemented processes in the plurality of computer-implemented processes to an applied final response;
  identify respective break event symptoms for the break event flags in the list of break event flags;
  determine, for each identified respective break event symptom, a computing environment corresponding to each respective break event symptom, a code environment corresponding to each respective break event symptom, and a final response strategy corresponding to each respective break event symptom;
  generate a simulation non-functional requirement score for each respective computer-implemented process of the plurality of computer-implemented processes based on the identified respective break event symptom, the determined computing environment, the determined code environment, the break event symptom corresponding to the respective computer-implemented process, and the final response strategy corresponding to each respective break event symptom of the respective computer-implemented process;
  generate a risk score for each computer-implemented process of the plurality of computer-implemented processes based on the identified break event symptom, and the final response strategy corresponding to the break event symptom of the respective computer-implemented process; and
  store the generated simulation non-functional requirement and risk scores of each computer-implemented process with a timestamp indicating when the simulation result snapshot was taken in a data structure.

18. The non-transitory computer-readable storage medium of claim 14, further comprising computer-readable program code that when executed causes the processor to:
- in response to applying the located final response to the simulation instance, generate, for each computer-implemented process of the plurality of computer-implemented processes, a modified non-functional requirement score of a respective updated non-functional requirement score and a modified risk score of a respective updated risk score; and
- store each of the modified non-functional requirement scores and each of the modified risk scores in the cure result snapshot.

19. The non-transitory computer-readable storage medium of claim 14, further comprising computer-readable program code that when evaluating the pre-breakage snapshot, the simulation result snapshot, and the cure result snapshot with reference to one another executed causes the processor to:
- identify, for each computer-implemented process of the plurality of computer-implemented processes, score changes of non-functional requirement scores and risk scores between the pre-breakage snapshot and the simulation result snapshot, and changes in non-functional requirement scores and risk scores between the simulation result snapshot and the cure result snapshot for each of the computer-implemented processes;
- recognize, by evaluating the identified score changes by a rules engine, interdependencies between each computer-implemented process in the plurality of computer-implemented processes; and
- in response to the recognized interdependencies, identify an operating state of each respective computer-implemented process in the plurality of computer-implemented processes that provides a below-threshold risk score for each respective computer-implemented process and an above-threshold non-functional requirement score for each respective computer-implemented process.

20. The non-transitory computer-readable storage medium of claim 14, further comprising computer-readable program code that when executed causes the processor to:
- select a process volatility having an assigned break event risk assessment value for simulation, wherein the selected process volatility is assigned a break event risk assessment value having a range from a value indicating the process volatility has a high likelihood of causing a computer-implemented process break to a value indicating the process volatility has a low likelihood of causing a computer-implemented process break; and
- identify a break event flag corresponding to the selected process volatility for simulation.

* * * * *